US009187106B2

(12) United States Patent
Khodor (10) Patent No.: US 9,187,106 B2
(45) Date of Patent: Nov. 17, 2015

(54) FOLDING CHASSIS FOR MANUALLY DRIVEN CARRIER VEHICLES CAPABLE OF TRAVERSING OBSTACLES

(71) Applicant: Leonid Khodor, Orange, OH (US)

(72) Inventor: Leonid Khodor, Orange, OH (US)

(73) Assignee: TriFold, LLC, Orange, OH (US)

( * ) Notice: Subject to any disclaimer, the term of this patent is extended or adjusted under 35 U.S.C. 154(b) by 25 days.

(21) Appl. No.: 14/107,247

(22) Filed: Dec. 16, 2013

(65) Prior Publication Data

US 2015/0166088 A1    Jun. 18, 2015

Related U.S. Application Data

(63) Continuation-in-part of application No. 13/575,007, filed as application No. PCT/US2011/023655 on Feb. 3, 2011, now Pat. No. 8,641,059.

(60) Provisional application No. 61/302,537, filed on Feb. 8, 2010, provisional application No. 61/432,923, filed on Jan. 14, 2011.

(51) Int. Cl.
  *B62B 1/12* (2006.01)
  *B62B 1/04* (2006.01)

(52) U.S. Cl.
  CPC ...................... *B62B 1/042* (2013.01)

(58) Field of Classification Search
  CPC .............................. B62B 2202/404; B62B 1/12

USPC .......... 280/47.27, 43.11, 43.14, 47.23, 47.24, 280/47.17
  See application file for complete search history.

(56) References Cited

U.S. PATENT DOCUMENTS

| 2,699,951 | A | 1/1955 | Gans |
| 5,468,005 | A | 11/1995 | Yang |
| 5,630,601 | A | 5/1997 | vom Braucke |
| 5,803,471 | A | 9/1998 | DeMars |
| 6,557,869 | B2 * | 5/2003 | Gillette et al. ............. 280/47.28 |
| 6,874,799 | B2 | 4/2005 | Robberson |
| 7,631,380 | B1 | 12/2009 | Larson |
| 7,669,862 | B2 | 3/2010 | Kamara et al. |
| 2007/0075509 | A1 | 4/2007 | Wyrick, III |
| 2007/0222165 | A1 | 9/2007 | Hope |

* cited by examiner

*Primary Examiner* — John Walters
*Assistant Examiner* — James Triggs
(74) *Attorney, Agent, or Firm* — Leonid Khodor (57) ABSTRACT

Disclosed is a folding chassis of manually driven carrier vehicles, for example, hand trucks, carts, and strollers, capable of moving over uneven, soft or spongy surfaces and surmounting obstacles. The chassis includes a frame having a reference plane and an arm having a first axis and a second axis, said arm being attached rotatable around the first axis to said frame and configured for attaching rotatable, around the second axis, a wheel arrangement having a diameter at least equal to a half of a width of said frame. Said arm is configured to pivot between at least a first and a second positions of said wheel arrangement, wherein, in the first position, said wheel arrangement is generally perpendicular to said reference plane and wherein, in the second position, said wheel arrangement is adjacent and parallel to said reference plane.

16 Claims, 10 Drawing Sheets

FOLDING CHASSIS FOR MANUALLY DRIVEN CARRIER VEHICLES CAPABLE OF TRAVERSING OBSTACLES

CROSS-REFERENCE TO RELATED APPLICATIONS

This application is a continuation-in-part under 35 U.S.C §120 of U.S. Ser. No. 13/575,007, filed Jul. 24, 2012 and published on Nov. 22, 2012 as US20120292889 A1, the entire content of which is incorporated herein by reference.

FIELD OF THE INVENTION

The present invention generally relates to manually driven carrier vehicles, such as carts, hand trucks, dollies, and strollers and, more particularly, to a folding chassis therefor capable of traversing obstacles.

BACKGROUND OF THE INVENTION

Various manually driven carrier vehicles, for example, hand trucks, carts and strollers, are commonly used for moving objects that are otherwise inconvenient for a person to carry due to size and/or weight, or for transporting infants and toddlers. Often, these carts and strollers have foldable chassis for ease of storage and transportation when not in use. These carriers typically have a telescoping or folding handle, a folding chassis, and wheels set into a predetermined position. Such carts and strollers often have limited capability to traverse rough or uneven terrain because the portability requirement in the folded state limits the range of possible wheel diameters, which, in turn, limits suspension responsiveness. This is because the efforts of moving a cart or a stroller at a given coefficient of friction depend inversely on ratios of wheel to axle diameters and the wheel diameter to height of an obstacle. Other carriers, besides having a telescoping or folding handle and a folding chassis, utilize removable wheels of relatively large size as means to improve terrain trafficability, yet reduce overall dimensions in the folded state. However, removing the wheels requires additional time and complicates handling and storage of the carrier, particularly after use on wet or muddy surfaces.

Thus, conventional folding carts and strollers, in addition to be able to transport a predetermined load, are designed primarily for convenient handling and portability when folded. However, these known carts and strollers, independently of any trade-offs between the convenience of use and the size in the folded state, are difficult to handle when moving over an irregular terrain, curbs, stairs, and other obstacles. Carrier chassis better capable of dealing with uneven surfaces are inconvenient to store or transport when folded.

Therefore, it is desirable to provide a folding carrier chassis capable of moving over a rough terrain, including curbs, stairs, and spongy soil. Additionally, it is desirable to have such carrier chassis be foldable relatively flat to provide for ease of storage and transportation. Further, such chassis should preferably be easily folded without disassembling.

SUMMARY OF THE INVENTION

The present invention relates to a manually driven carrier vehicle having a foldable chassis configured for moving over uneven, soft or spongy surfaces and surmounting obstacles as well as climbing up and down (i.e. "walking") over curbs, and stairs, that is easy to handle, convenient to use, and folds flat. Particularly, in its various embodiments and implementations, the invention provides for a decreased pressure applied by the chassis onto an underlying terrain, improved stability, decreased pull/push forces especially for moving over the irregular terrain, and improved portability when folded. As a result, when implemented, the carrier according to various embodiments of the present invention facilitates broader participation in outdoor activities by enabling physically handicapped persons to transport their belongings anywhere easily.

Generally, in one aspect, the invention focuses on a folding chassis that includes a frame having a reference plane, an arm having a first axis and a second axis, said arm being attached rotatable to said frame around the first axis and configured for attaching rotatable, around the second axis, a wheel arrangement having a diameter at least equal to a half of a width of said frame, wherein said arm is configured to pivot between at least a first position and a second position of said wheel arrangement, wherein, in the first position, said wheel arrangement is generally perpendicular to said reference plane and wherein, in the second position, said wheel arrangement is adjacent and parallel to said reference plane.

In some embodiments, said first axis is positioned at acute angles to said reference plane and to a plane perpendicular to said reference plane. For example, said first axis can be positioned at a first angle to said reference plane in a range from about 15 to 55° and at a second angle to a plane perpendicular to said reference plane in a range from about 30 to 75°.

In some embodiments, said wheel arrangement includes at least one wheel. In other embodiments, said wheel arrangement includes a plurality of wheels rotatable around axes parallel to said second axis. For example, said plurality of wheels may include three wheels positioned symmetrically relative to said second axis. Also, in various embodiments, said wheel arrangement in the second position is positioned such that it does not exceed a height of said frame.

In some embodiments, the folding chassis includes a platform configured to pivot from been generally perpendicular to said frame to been generally adjacent and parallel to said frame. Said arm and said platform can be configured to pivot simultaneously from the first position of said wheel arrangement and said platform been generally perpendicular to said frame to said wheel arrangement and said platform been generally adjacent and parallel to said reference plane and said frame respectively. Said arm and said platform can be connected by gear segments.

In some embodiments, the folding chassis further includes a support pivotally attached to said platform and linked to said frame and said platform, wherein said support configured to pivot between supporting said platform been generally perpendicular to said frame and been generally adjacent and parallel to said platform been generally adjacent and parallel to said frame. For example, said support can be biased to pivot from an intermediate position to one of the end positions.

BRIEF DESCRIPTION OF DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

In the following detailed description, for purposes of explanation and not limitation, representative embodiments disclosing specific details are set forth in order to provide a thorough understanding of the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatuses and methods may be omitted so as to not obscure the description of the representative embodiments. Such methods and apparatuses are clearly within the scope of the present teachings. Set forth for better clarity in symmetrical structures, like reference characters may generally refer to like functioning mirrored parts as well as the same parts.

Figures 1A, 1B:
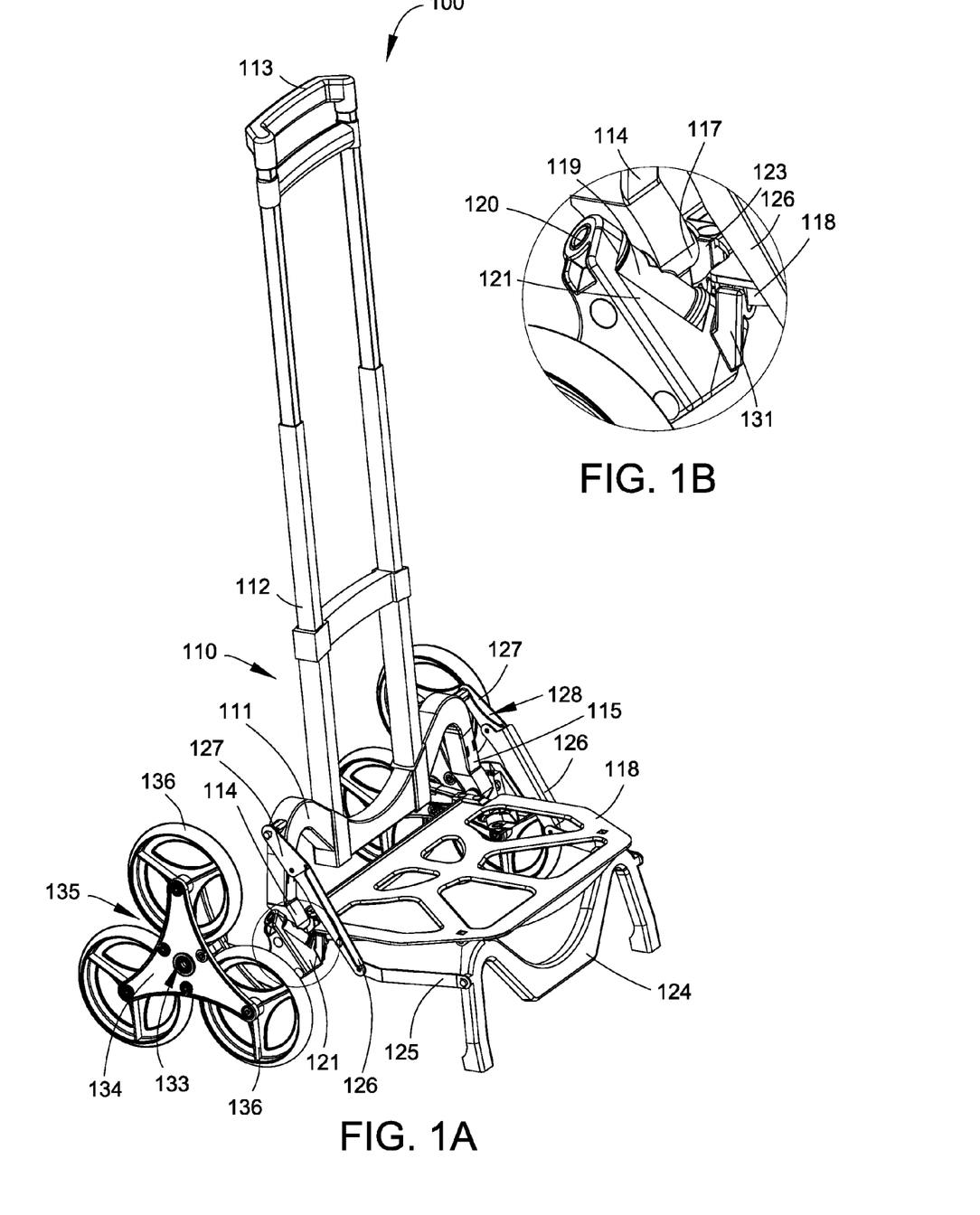
FIGS. 1A and 1B depict respectively a perspective view of an embodiment of a cart chassis in unfolded state according to present invention and magnified partial view of elements of the chassis.
Figure 2A:
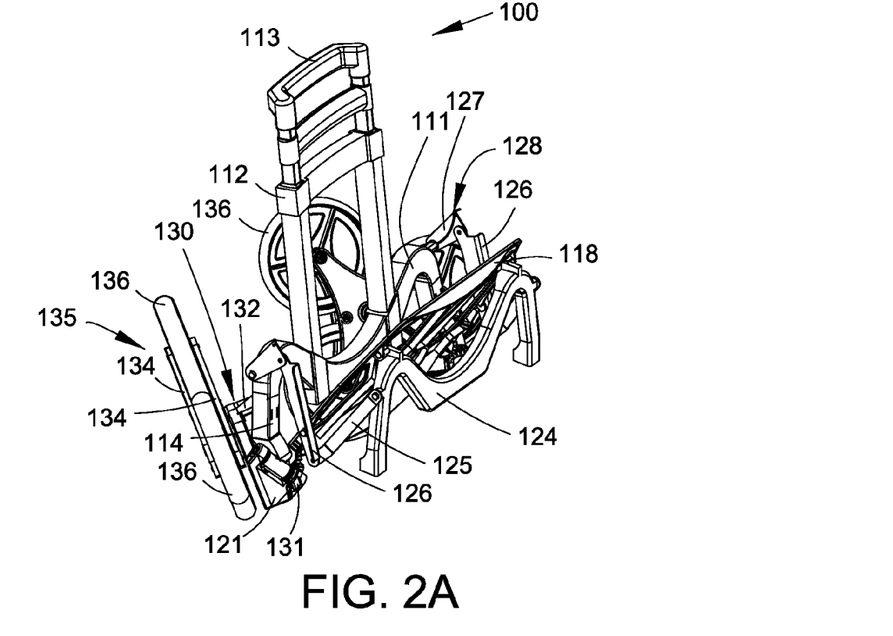
FIGS. 2A-2C depict respectively perspective, back, and side views of the embodiment shown in FIG. 1A in a partially folded state.
Figure 2B:
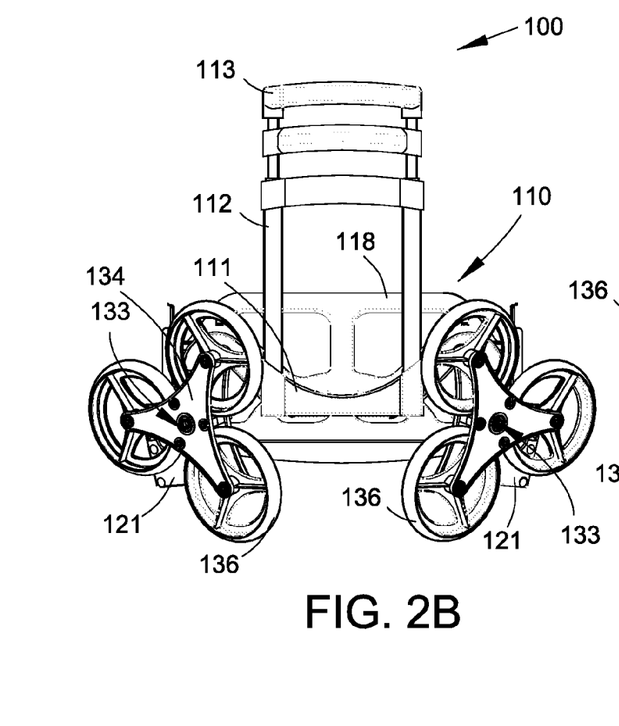
Figure 2C:
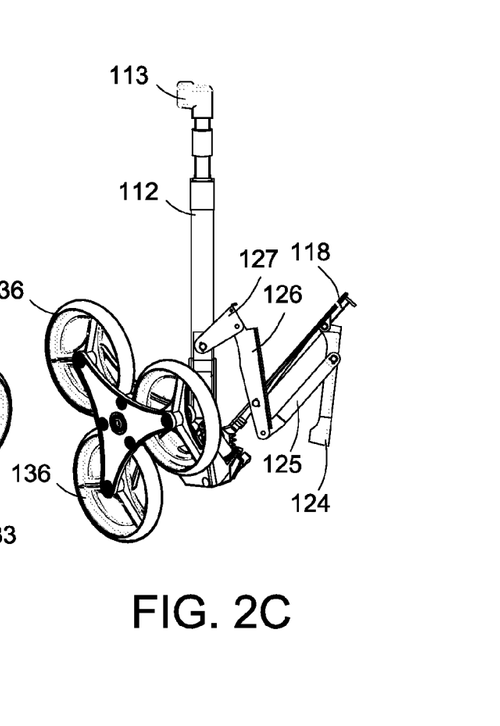
Figure 3A:
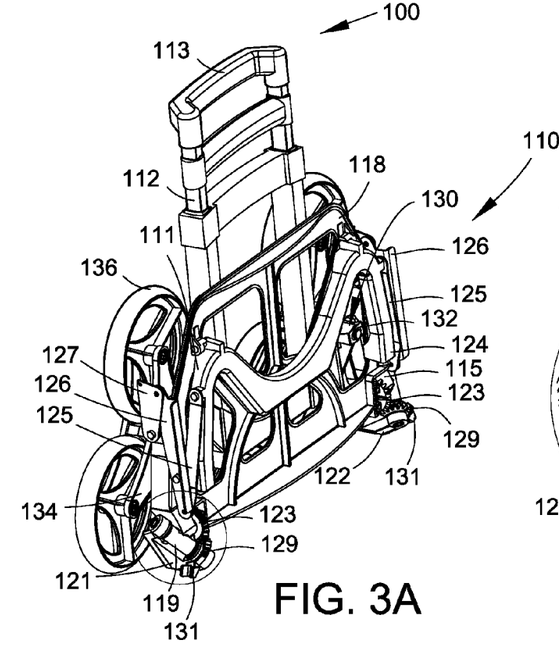
FIGS. 3A-3D depict respectively perspective, magnified partial, back, and side views of the embodiment shown in FIG. 1A in a folded state.
Figure 3B:
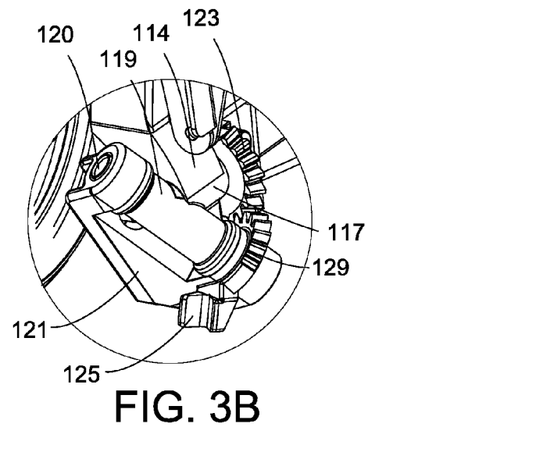
Figure 3C:
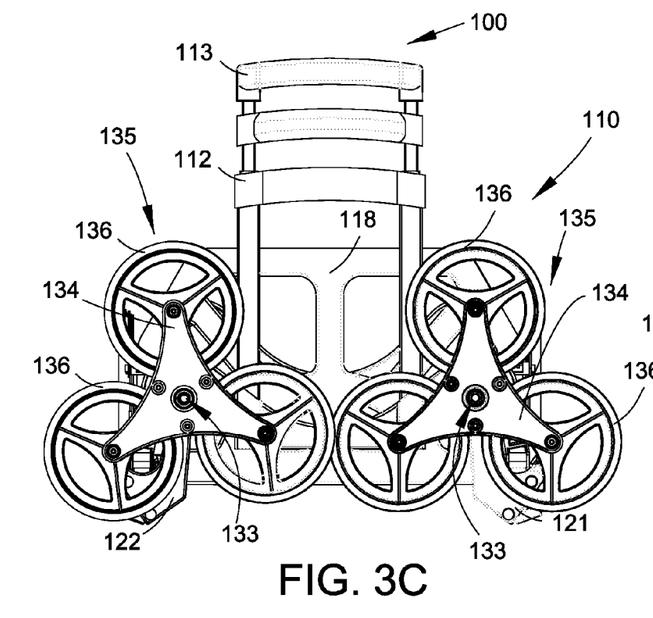
Figure 3D:
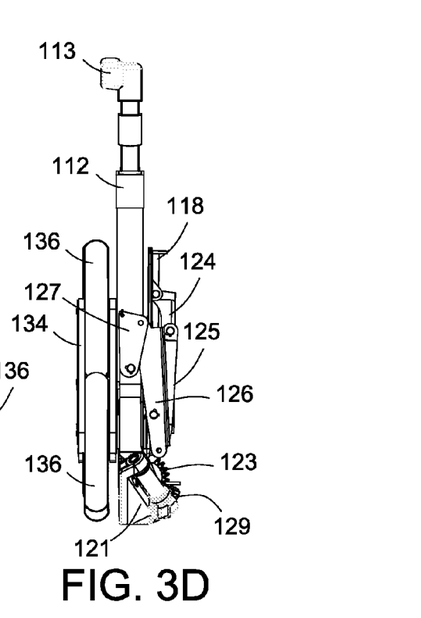
Figure 4:
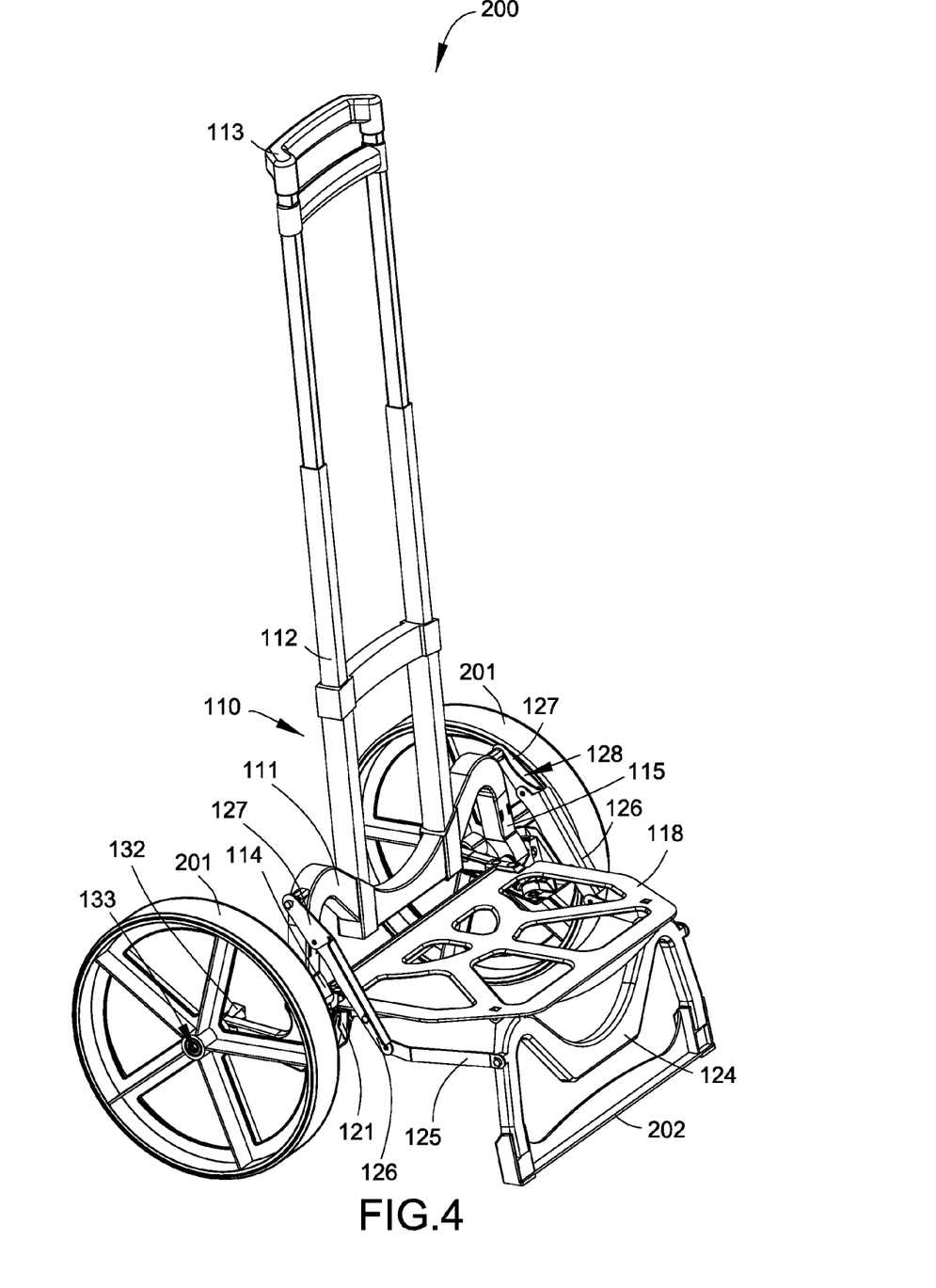
FIG. 4 depicts perspective view of another embodiment of the cart chassis in unfolded state according to present invention.
Figure 5A:
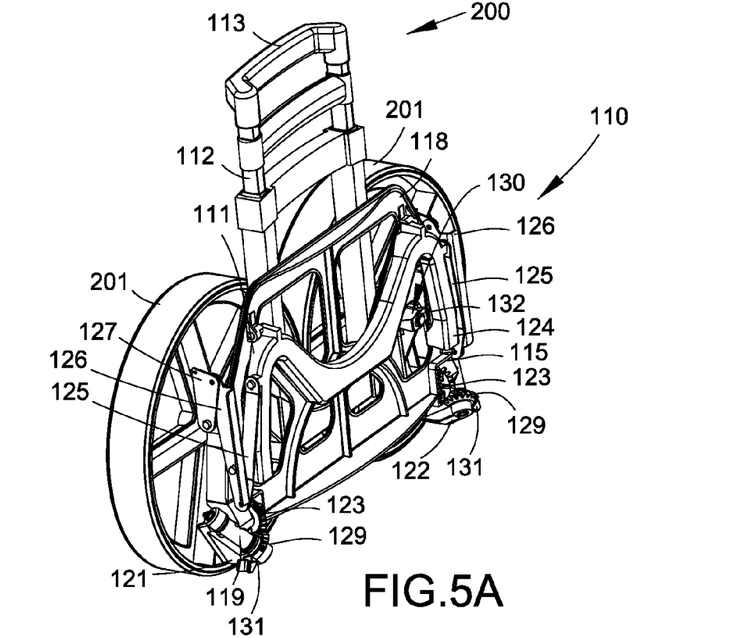
FIGS. 5A-5C depict respectively perspective, back, and side views of the embodiment shown in FIG. 4 in a folded state.
Figure 5B:
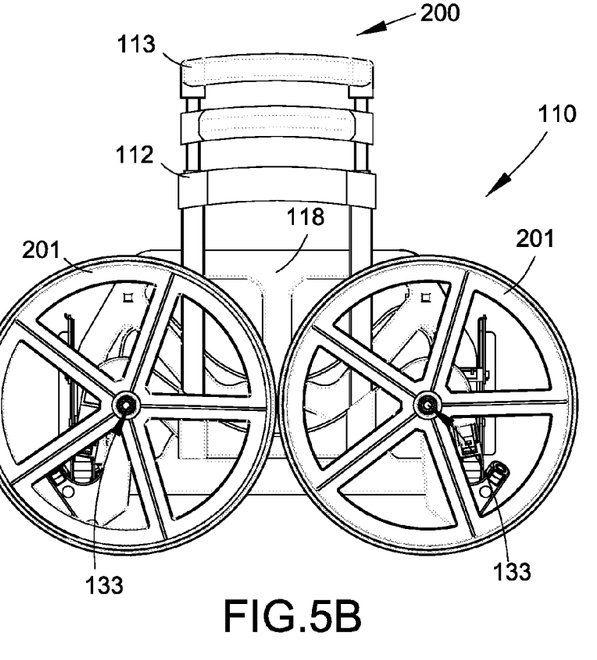
Figure 5C:
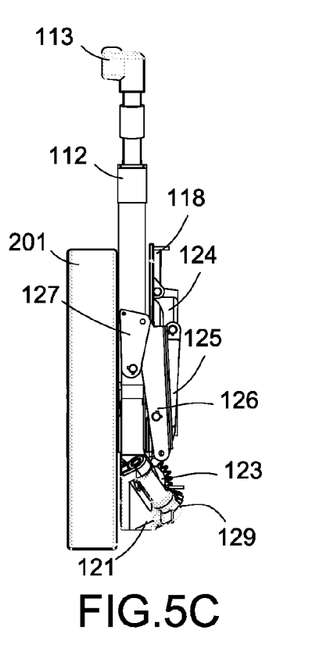
Figures 6A, 6B:
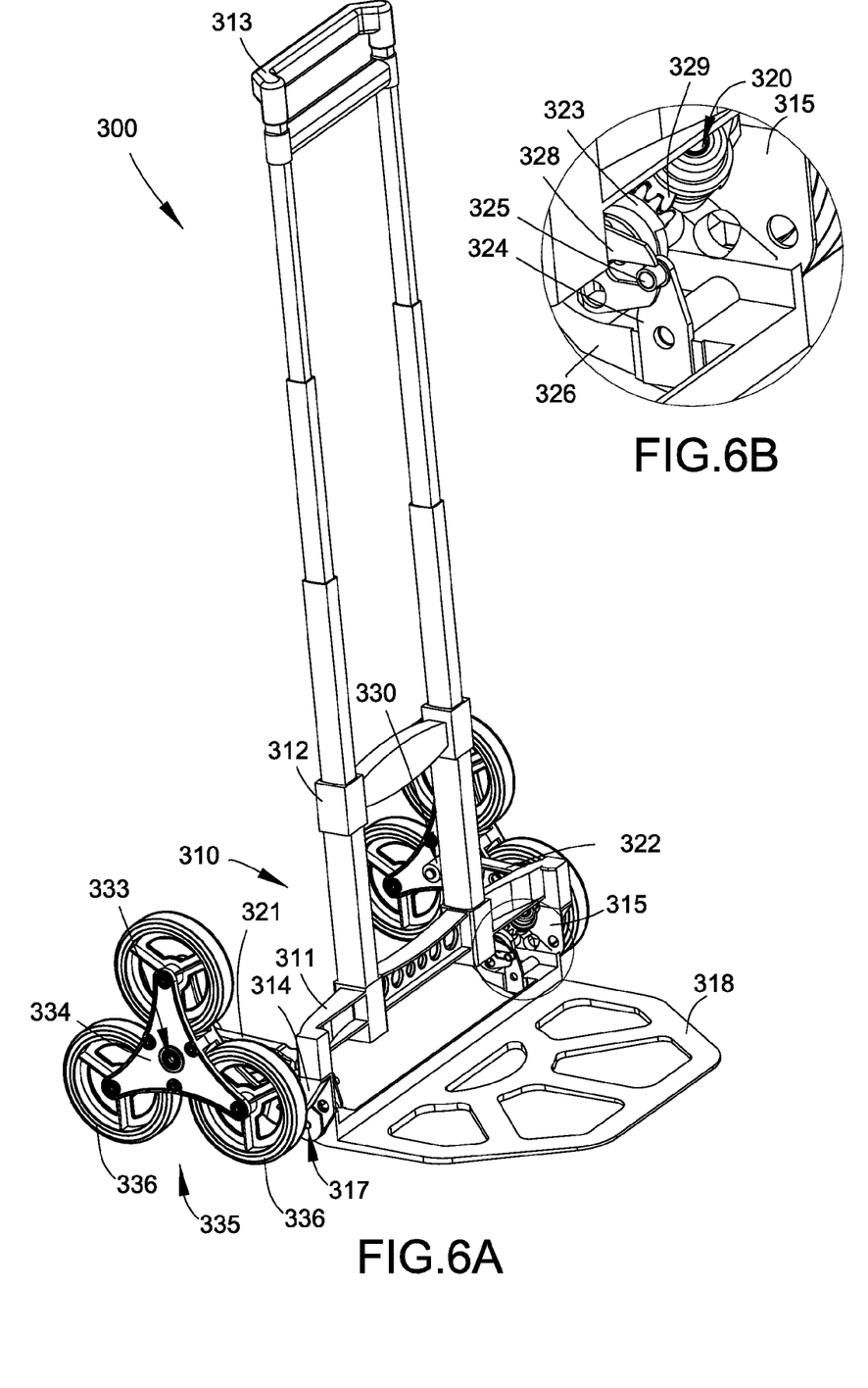
FIGS. 6A and 6B depict respectively a perspective view of an embodiment of hand-truck chassis in unfolded state according to present invention and magnified partial view of elements of the chassis.

Referring to FIGS. 1A-3D, in one embodiment, a generally symmetrical chassis 110 of a cart 100 includes a bridge 111 that supports a telescoping frame 112 with a handle 113 and has knuckles 114 and 115 at its opposite ends. The knuckles 114 and 115 are mirror images of each other and may be integral parts of the bridge 111 or separate components attached thereto. Each of the knuckles 114 and 115 includes an element 117 for pivoting a platform 118 and an element 119 holding axles 120 that are pivoting axes of respectively arms 121 and 122. The elements 117 and 119 may be holes or pins as integral parts of each of the knuckles 114 and 115 or attached components. The elements 117 are coaxial and the axles 120 in the elements 119 form acute angles with a reference plane (not shown) of the frame 112, the symmetry plane, and the platform 118. As used herein, the reference plane is a plane defined by axes of the elements 117 and general proximity to the frame 112 surface. For example, although the frame 112 is shown as a flat structure it may be not so, in which case the reference plane would be a design feature defining dimensions of the cart 100 in the folded state. For a flat frame, the reference plane may be parallel to the frame surface. The angle to the platform 118 as shown in FIGS. 1A and 1B may be in a range from about 30 to about 75°, preferably about 60°, and the angle to the reference plane of the frame 112 may be in a range about from 15 to 55°, preferably about 35°.

With continued reference to FIGS. 1A-3D, gear segments 123 attached to the platform 118 coaxially with the elements 117. A support 124 may be hinged at a distal end of the platform 118. Links 125 may connect the support 124 with levers 126 attached pivotally to the platform 118 and connected to the bridge 111 by links 127. The links 125 and 127 are connected to the levers 126 pivotally as well. In the unfolded state of the chassis 110, three pivot axes of the levers 126 and the links 127 are aligned in a straight line that prevents the platform 118 from folding. Springs 128 may be placed between the bridge 111 and the links 127 in such manner that the platform 118 and the support 124 through the links 127 and the levers 126 would be biased from an intermediate position to one of either folded or unfolded positions.

The arms 121 and 122 are mirror images of each other and each may comprise hinge elements, for example holes, defining an axis of pivoting around the axle 120, a gear segment 129 meshed with the corresponding gear segment 123, an element 130 for attaching a wheel arrangement 135 and a catch 131 for engaging the platform 118 in the unfolded position. The element 130, as an axis of rotation, may be a stationary or rotational axle, a flange or, as shown in this embodiment, a boss with a hole and a latch 132 for a quick disconnect of an axle 133 inserted rotatable through side plates 134. Multiple wheels 136 may be arranged rotatable between the side plates 134, constituting a wheel arrangement 135 having a diameter. As used herein, the diameter of the wheel arrangement 135 is understood to mean a diameter of the smallest circle circumscribing the outer reach of the wheels in the wheel arrangement when rotated about the axle 133. Methods and means of fixing positions of one part relative to another well known in the art so, those of ordinary skill in the art will readily envision a variety of other means and/or structures for performing the function described above.

In order to fold the chassis 110, the support 124 is pushed toward the bridge 111 that, through the links 125, rotates the levers 126 bringing the common pivot of the levers 126 and the links 127 out of alignment and rotates the platform 118 toward the bridge 111. Rotation of the platform 118 causes rotation of the arms 121 and 122 toward the bridge 111 through gear segments 123 and 129. In the folded state, the arms 121 and 122 are generally aligned with the bridge 111 with the wheel arrangements 135 positioned side by side and adjacent and parallel to one side of the bridge 111 while the support 124 is generally adjacent and parallel with the platform 118, which is generally adjacent and parallel to another side of the bridge 111. It should be noted that the elements 130 with the wheel arrangements 135 relative to the knuckles 114 and 115 may be positioned higher in the folded state than in unfolded.

Referring to FIGS. 4-50, in another embodiment, the cart 200 differs from the cart 100 described above in that respect that each of wheel arrangements 201 may consist a single wheel placed on the axle 133 and an optional support extender 202 may be added to the support 124 in order to level the platform 118.

Referring to FIGS. 6A-8D, in yet another embodiment of the present invention, a generally symmetrical chassis 310 of a hand truck 300 comprise a bridge 311 that supports a telescoping frame 312 with a handle 313 and has knuckles 314 and 315 at its opposite ends. The knuckles 314 and 315 are mirror images of each other and may be integral parts of the bridge 311 or attached components. Each of the knuckles 314 and 315 comprise an element 317 for pivoting a platform 318, a rotatable gear segment 323, and an element 319 holding axles 320 that are pivoting axes of respectively arms 321 and 322. The elements 317 and 319 may be holes or pins as integral parts of each of the knuckles 314 and 315 or attached components. The elements 317 are coaxial while the axes 320 in the elements 319 form acute angles with a reference plane (not shown) of the frame 312, the symmetry plane, and the platform 318. As used herein, the reference plane is a plane defined by axes of the elements 317 and general proximity to the frame 312 surface.

Figure 7A:
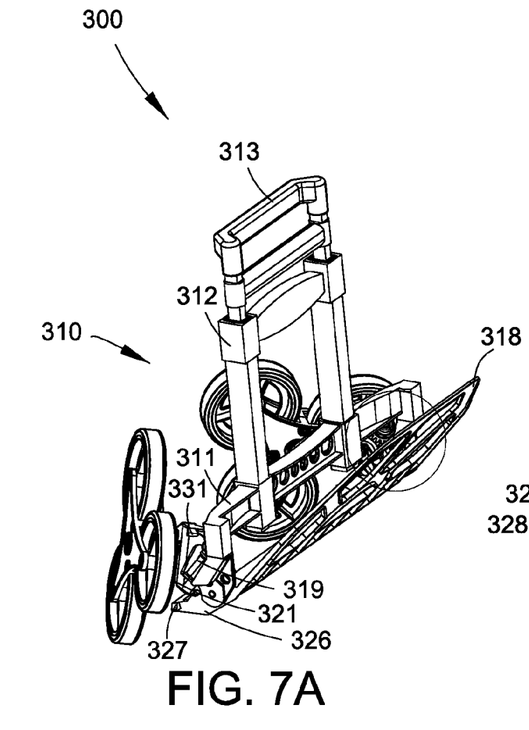
FIGS. 7A-7D depict respectively perspective, magnified partial, back, and side views of the embodiment shown in FIG. 6 in a partially folded state.
Figure 7B:
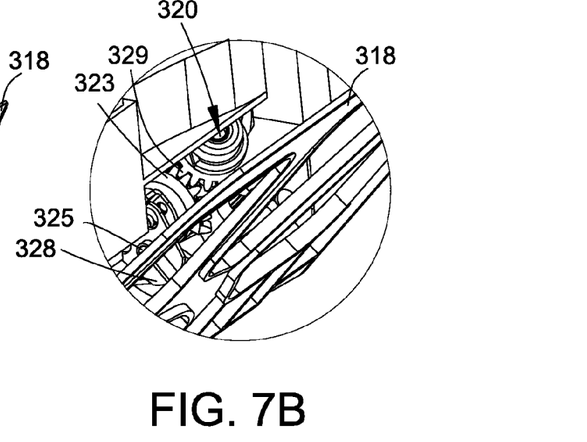
Figure 7C:
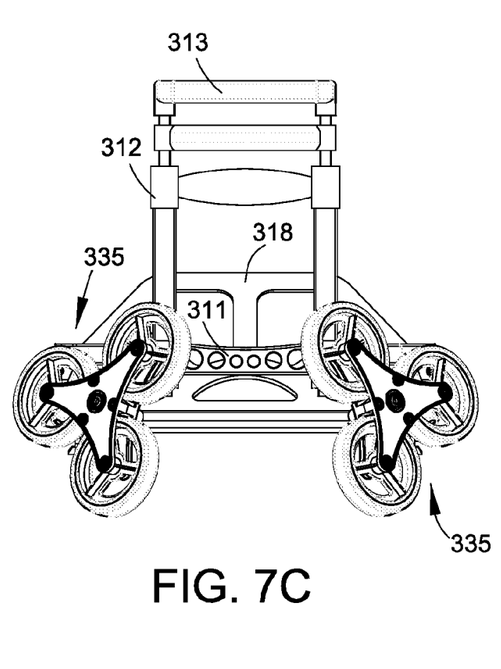
Figure 7D:
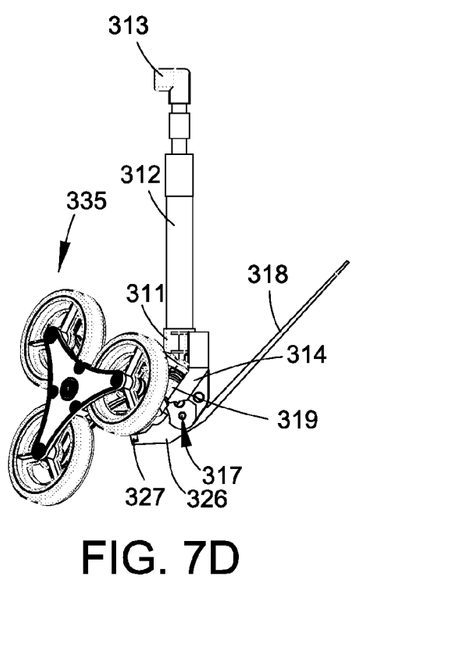
Figure 8A:
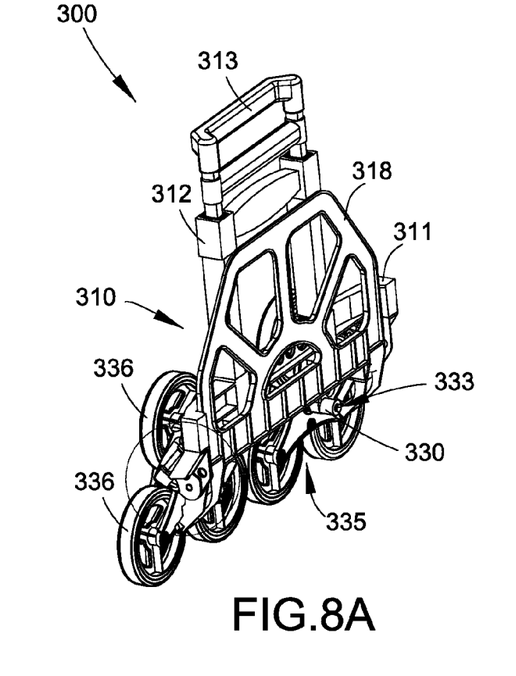
FIGS. 8A-8D depict respectively perspective, magnified partial, back, and side views of the embodiment shown in FIG. 6 in a folded state.
Figure 8B:
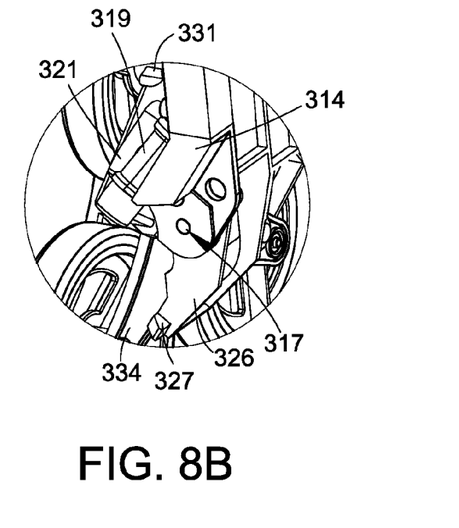
Figure 8C:
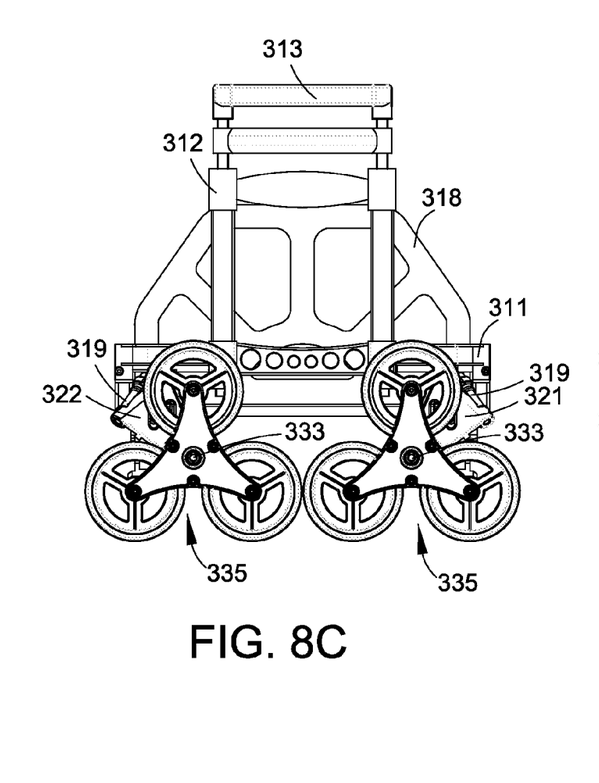
Figure 8D:
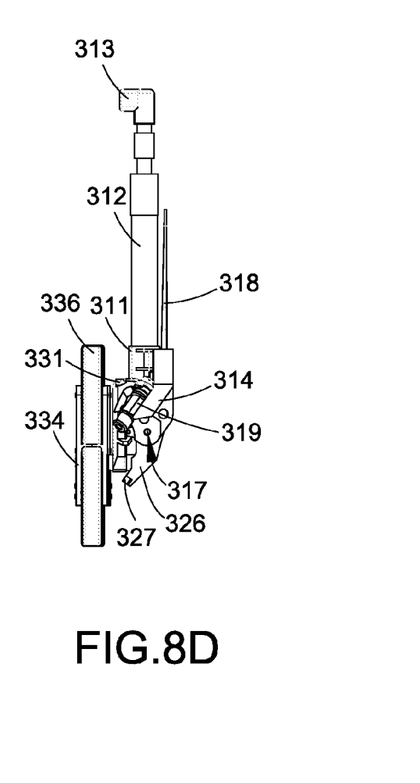

The angles to the platform 318 as shown in FIGS. 7A and 8B may be in a range from about 30 to about 75°, preferably about 60°, and the angle to the reference plane of the frame 312 may be in a range about from 15 to 55°, preferably about 35°. Positions of the knuckles 314 and 315 relative to the bridge 311 are mirror images of respective positions of the knuckles 114 and 115 relative to the bridge 111 in the previous embodiments.

The platform 318 includes rockers 324 with cam followers 325 positioned symmetrically and configured to engage slotted levers 328 attached to the gear segments 323. The rockers 324 are attached to extensions 326 with stoppers 327, which may interact with the knuckles 314 and 315 and the arms 321 and 322 respectively.

The arms 321 and 322 are mirror images of each other and each may include hinge elements, for example holes, defining an axis of pivoting around the axle 320, a gear segment 329 meshed with the corresponding gear segment 323, an element 330 for attaching a wheel arrangement 335, and a stopper 331 for engaging the frame 312 in the unfolded position. The element 330, as an axis of rotation, may be a stationary or rotational axle, a flange or, as shown in this embodiment, a boss with a hole and a latch (not shown) for a quick disconnect of an axle 333 inserted rotatable through side plates 334. Multiple wheels 336 may be placed rotatable between the side plates 334. A diameter of the wheel arrangement 335 is understood to mean a diameter of the smallest circle circumscribing the outer reach of the wheels in the wheel arrangement when rotated about the axle 333. Methods and means of fixing positions of one part relative to another well known in the art so, those of ordinary skill in the art will readily envision a variety of other means and/or structures for performing the function described above.

In the unfolded position, the elements 317 may stop extensions 326 that limits pivoting of the platform 318 to being generally perpendicular to the frame 312, and, with the elements 330 generally coaxial, the arms 321 and 322 are set between the stoppers 327 of the platform 318 from one side and the frame 312 from another. In order to fold the chassis 310, the platform 318 is rotated toward the frame 312. Rotation of the platform 318 causes rotation of the arms 321 and 322 toward the bridge 311 through the cam followers 325, the levers 328 and the gear segments 323 and 329. In the folded state, the arms 321 and 322 are generally aligned with the bridge 311 with the wheel arrangements 335 positioned side by side and adjacent and parallel to one side of the bridge 311 while the platform 318 is generally adjacent and parallel to another side of the bridge 311. It should be noted that the elements 330 with the wheel arrangements 335 positioned relative to the knuckles 314 and 315 lower in the folded state than in unfolded.

Figure 9:
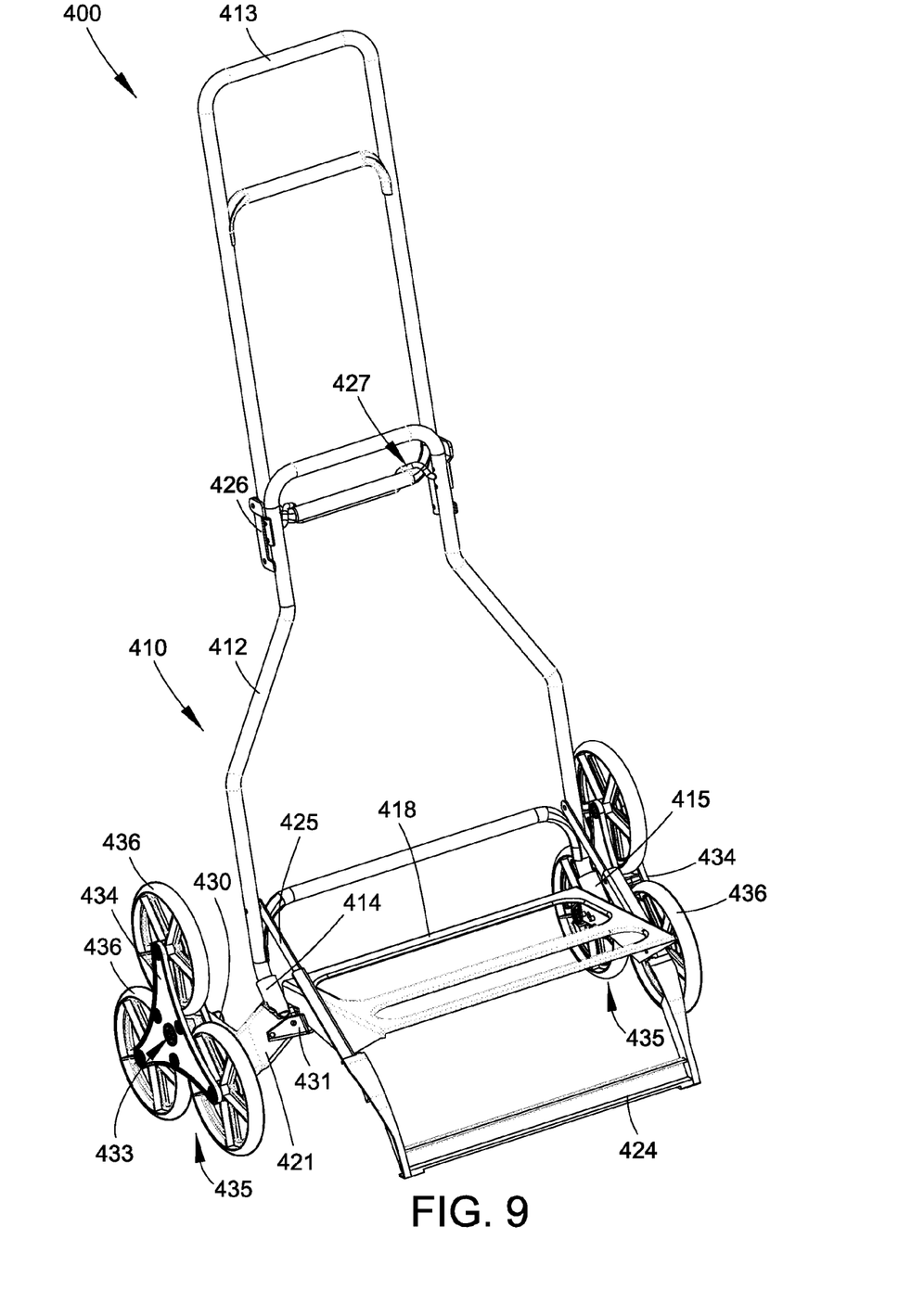
FIG. 9 depicts a perspective view of yet another embodiment of the cart chassis in unfolded state according to present invention.
Figures 10A, 10B:
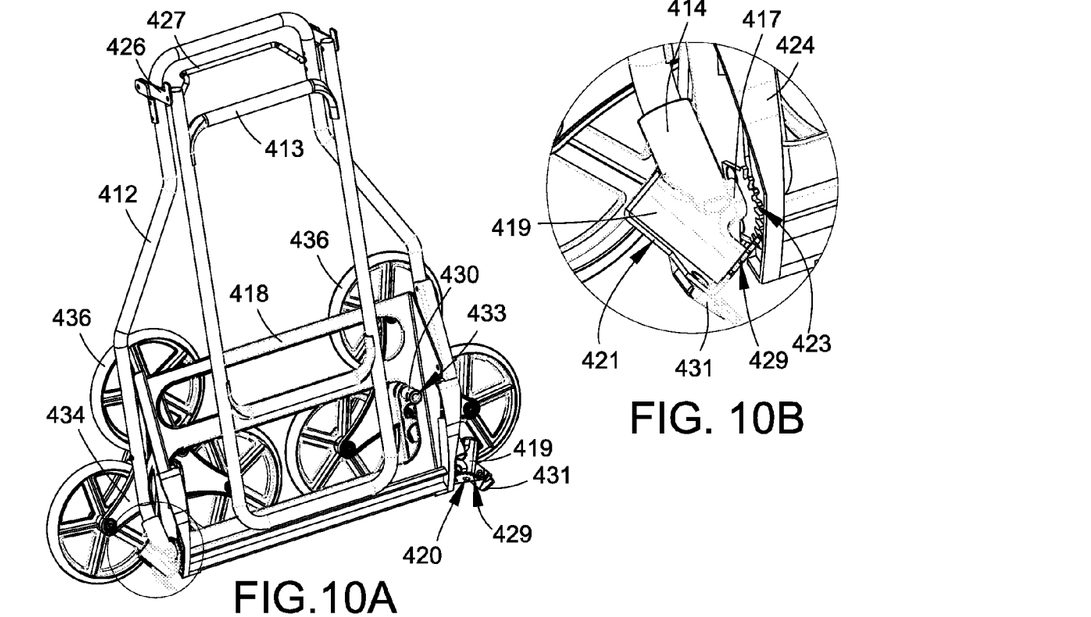
FIGS. 10A-10D depict respectively perspective, magnified partial, back, and side views of the embodiment shown in FIG. 9 in a folded state.
Figure 10C:
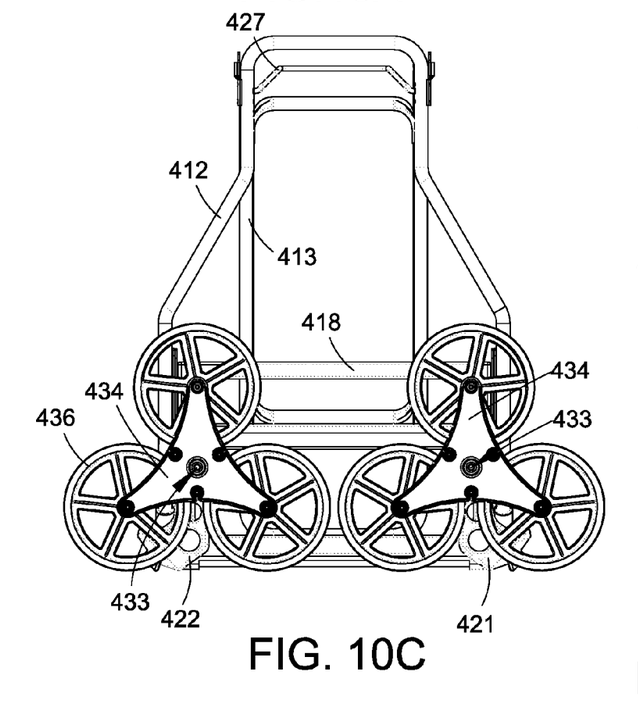
Figure 10D:
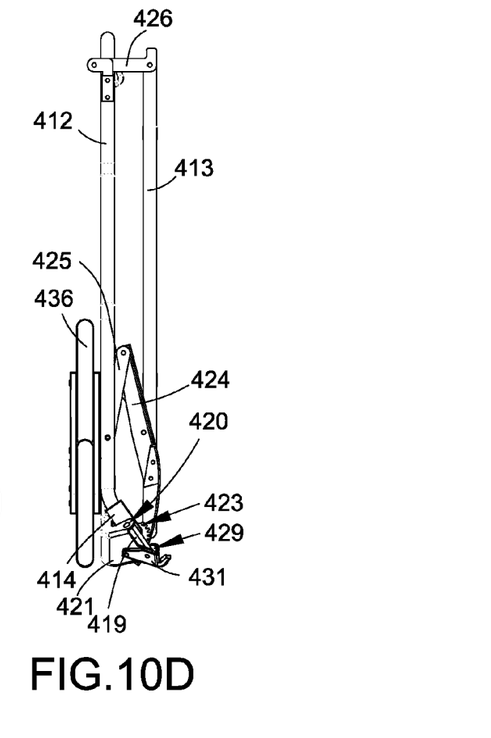

Referring to FIGS. 9-10D, in yet another embodiment of the present invention, a generally symmetrical chassis 410 of a cart 400 includes a frame 412 with a handle 413 and has knuckles 414 and 415 at its opposite ends. The knuckles 414 and 415 are mirror images of each other and may be integral parts of the frame 412 or attached components. Each of the knuckles 414 and 415 includes an element 417 for pivoting a platform 418 and an element 419 holding axles 420 that are pivoting axes of respectively arms 421 and 422. The elements 417 and 419 may be holes or pins as integral parts of each of the knuckles 414 and 415 or attached components. The elements 417 are coaxial and the axles 420 in the elements 419 form acute angles with a reference plane (not shown) of the frame 412, the symmetry plane, and the platform 418. As explained previously with reference to FIGS. 1A-3C, as used herein, the reference plane is a plane defined by axes of the elements 417 and general proximity to the frame 412 surface. The angles to the platform 418 as shown in FIGS. 10A-10D may be in a range from about 30 to about 75°, preferably about 60°, and the angle to the reference plane of the frame 412 may be in a range about from 15 to 55°, preferably about 35°.

Gear segments 423 attached to the platform 418 coaxially with the elements 417. A support 424 may be attached pivotally to the platform 418 and to links 425 that as well attached pivotally to the frame 412. In the unfolded state of the chassis 410, three pivot axes of the support 424 and the links 425 are aligned in a straight line that prevents the platform 418 from folding. The platform 418 may be biased from an intermediate position to one of either folded or unfolded positions through the support 424 and/or the links 425.

Links 426 attached pivotally to the frame 412 and the handle 413 define positioning of the handle 413 while a latch 427 may lock the handle 413 in unfolded state.

The arms 421 and 422 are mirror images of each other and each may comprise hinge elements, for example holes, defining an axis of pivoting around the axle 420, a gear segment 429 meshed with corresponding gear segment 423, an element 430 for attaching a wheel arrangement 435, and a catch 431 for engaging the platform 418 in the unfolded position. The element 430, as an axis of rotation, may be a stationary or rotational axle, a flange or, as shown in this embodiment, a boss with a hole and a latch (not shown) for a quick disconnect of an axle 433 inserted rotatable through side plates 434. Multiple wheels 436 may be arranged rotatable between the side plates 434, constituting a wheel arrangement 435 having a diameter. As used herein, the diameter of the wheel arrangement 435 is understood to mean a diameter of the smallest circle circumscribing the outer reach of the wheels in the wheel arrangement when rotated about the axle 433. Methods and means of fixing positions of one part relative to another well known in the art so, those of ordinary skill in the art will readily envision a variety of other means and/or structures for performing the function described above.

In order to fold the chassis 410, the support 424 is pushed toward the frame 412, which rotates the link 425 bringing the pivot axes of the support 424 and the links 425 out of alignment, and rotates the platform 418 toward the frame 412. Rotation of the platform 118 causes rotation of the arms 421 and 422 toward the frame 412 through gear segments 423 and 429. In the folded state, the arms 421 and 422 are generally aligned with the frame 412 with the wheel hubs 435 positioned side by side and adjacent and parallel to one side of the frame 412 while the support 424 may be generally adjacent to the platform 118, which may be generally adjacent and parallel to another side of the frame 412. It should be noted that, relative to the knuckles 414 and 415, the elements 430 with the wheel hubs 435 may be positioned higher in the folded state than in unfolded. Following unlatching the latch 427, the handle 413 may be rotated about 180° with the links 426 rotated about 270° to overlap the platform 418.

Consequently, in its various embodiments, the present invention provides the versatile folding chassis for easily moving over all kinds of terrain, traversing curbs, as well as ascending or descending stairs. Furthermore, the invention provides that such chassis folds relatively flat for better handling and storage in the folded state.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. For example, a removable track may be fitted over the wheels 151 of each of the hubs 150 for moving over a sandy or spongy terrain. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto; inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Accordingly, as indicated above, the foregoing embodiments of the invention are examples and can be varied in many ways. Such present or future variations are not to be regarded as a departure from the spirit and scope of the invention, and all such modifications as would be apparent to one skilled in the art are intended to be included within the scope of the following claims.

All definitions, as defined and used herein, should be understood to control over dictionary definitions, definitions in documents incorporated by reference, and/or ordinary meanings of the defined terms.

I claim:

1. A folding chassis comprising:
a frame having a reference plane;
an arm having a first axis and a second axis, said arm being attached rotatable to said frame around the first axis and configured for attaching rotatable, around the second axis, a wheel arrangement having a diameter at least equal to a half of a width of said frame,
wherein said arm is configured to pivot between at least a first position and a second position of said wheel arrangement, wherein, in the first position, said wheel arrangement is generally perpendicular to said reference plane and wherein, in the second position, said wheel arrangement is adjacent and parallel to said reference plane.

2. The folding chassis of claim 1, wherein said first axis positioned at acute angles to said reference plane and to a plane perpendicular to said reference plane.

3. The folding chassis of claim 2, wherein said first axis positioned at a first angle to said reference plane in a range from about 15 to 55° and at a second angle to a plane perpendicular to said reference plane in a range from about 30 to 75°.

4. The folding chassis of claim 1, wherein said wheel arrangement comprises at least one wheel.

5. The folding chassis of claim 1, wherein said wheel arrangement comprises a plurality of wheels rotatable around axes parallel to said second axis.

6. The folding chassis of claim 5, wherein said plurality of wheels comprises three wheels positioned symmetrically relative to said second axis.

7. The folding chassis of claim 1, wherein said wheel arrangement in the second position is positioned such that it does not exceed a height of said frame.

8. The folding chassis of claim 1, further comprising a platform, said platform is configured to pivot from being generally perpendicular to said frame to being generally adjacent and parallel to said frame.

9. The folding chassis of claim 8, wherein said arm and said platform are configured to pivot simultaneously from the first position of said wheel arrangement and said platform being generally perpendicular to said frame to said wheel arrangement and said platform being generally adjacent and parallel to said reference plane and said frame respectively.

10. The folding chassis of claim 9, wherein said arm and said platform are connected by gear segments.

11. The folding chassis of claim 10, further comprising a rocker mechanism between said platform and said gear segments.

12. The folding chassis of claim 10, wherein said gear segments are having a ratio inversely proportional to corresponding angles of pivoting of said arm and said platform.

13. The folding chassis of claim 8, further comprising a support pivotally attached to said platform and linked to said frame and said platform, wherein said support configured to pivot between supporting said platform being generally perpendicular to said frame and being generally adjacent and parallel to said platform being generally adjacent and parallel to said frame.

14. The folding chassis of claim 13, wherein said support biased to pivot from an intermediate position to one of the end positions.

15. The folding chassis of claim 13, wherein, with said platform being generally perpendicular to said frame, a mutual positioning of said support, platform, and frame prevents pivoting of said platform relative to said frame.

16. The folding chassis of claim 8, wherein said wheel arrangement in said first position is configured to extend no lower than said platform when said platform is generally perpendicular to said frame and placed on a level surface.

* * * * *